(12) United States Patent
Baltzer

(10) Patent No.: US 8,132,244 B2
(45) Date of Patent: Mar. 6, 2012

(54) MOBILE SMARTCARD BASED AUTHENTICATION

(75) Inventor: Boris Baltzer, Nahe (DE)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 12/323,778

(22) Filed: Nov. 26, 2008

(65) Prior Publication Data

US 2009/0150667 A1    Jun. 11, 2009

(30) Foreign Application Priority Data

Dec. 7, 2007    (EP) .................................... 07122616

(51) Int. Cl.
*G06F 7/04* (2006.01)
*G06F 15/16* (2006.01)
*G06F 17/30* (2006.01)
*H04L 29/06* (2006.01)

(52) U.S. Cl. ................ 726/9; 726/20; 726/30; 713/159; 713/172; 713/185

(58) Field of Classification Search ................ 726/9, 20, 726/30; 713/159, 172, 185
See application file for complete search history.

(56) References Cited

U.S. PATENT DOCUMENTS

| | | | |
|---|---|---|---|
| 5,191,611 A * | 3/1993 | Lang ................................ | 705/53 |
| 6,549,912 B1 | 4/2003 | Chen | |
| 6,834,795 B1 * | 12/2004 | Rasmussen et al. .......... | 235/380 |
| 7,425,888 B2 * | 9/2008 | Powell .......................... | 340/10.2 |

FOREIGN PATENT DOCUMENTS

| | | |
|---|---|---|
| WO | WO 94/00936 A1 | 1/1994 |
| WO | WO 2007/104923 | 9/2007 |

OTHER PUBLICATIONS

"ACR88 Handheld Portable Smart Card Reader", Advanced Card Systems Ltd, Version 3.7, Aug. 2006.

* cited by examiner

*Primary Examiner* — Jeffrey D Popham
*Assistant Examiner* — Daniel Potratz
(74) *Attorney, Agent, or Firm* — Schmeiser, Olsen & Watts; Anna Linne

(57) ABSTRACT

In an authentication server, information representing a first part of a response to a challenge is received during the authentication preparation phase. The challenge and the first part of the response are stored for further use. The challenge is resent and information representing a second part of the response to the challenge is received during a modified authentication phase. The first and second parts of the response are checked against the challenge for authenticating the user. In a smartcard reader, the response received from the smartcard is sent to a computing device, when the smartcard reader received the challenge via an interface to the computing device during normal authentication. In response to the smartcard reader having received the challenge via the interface to the computing device during an authentication preparation phase, the smartcard reader sends the first part of the response to the computing device. In response to the smartcard reader having received the challenge via a user interface, it presents at least the second part of the response to a user via the user interface.

18 Claims, 3 Drawing Sheets

MOBILE SMARTCARD BASED AUTHENTICATION

FIELD OF THE INVENTION

The invention relates to a smartcard reader and an authentication server for processing authentication information as well as to corresponding methods and computer program products for processing authentication information.

BACKGROUND OF THE INVENTION

The demand for secure user authentication in computer networks, preferably for Internet services, is very high. Passwords are not very secure and might not fulfil the required security standards when personal data, bank accounts or health data have to be protected. Other solutions, like for example electronic tokens, are highly proprietary.

To overcome the problems in security and interoperability, the smartcard technology has been developed, combining standard compliance and very secure algorithms.

The use of smartcards for user authentication is considered to be a strong form of authentication and combines the use of something a user has, i.e. the smartcard, with something the user knows, e.g. a Personal Identification Number (PIN), to provide what is known as two-factor authentication. A smartcard is basically a small plastic card, about the size of a usual credit card, and typically contains a small embedded computer chip, i.e. a microchip, instead of the magnetic stripe provided in traditional credit cards. Smartcards are signature cards. Some of the certificates given on the smartcard are used for signing and some are used for authentication then.

It is known to provide an interactive smartcard login, as well as remote smartcard authentication. Users have the ability to access remote machines via their smartcard and interactively enter the PIN to login, just as if they physically walked up to the console of the remote machine. Remote smartcard authentication and interactive login do not require any type of smartcard middleware, and do not even require a smartcard reader attached to the remote machine.

For above mentioned reasons, smartcards are becoming more and more popular. Officials in several countries are thinking about issuing identity or authentication smartcards for their citizens. Furthermore, banks are issuing an increasing number of cards supporting digital signatures. Smartcards can be used for authentication in Internet services, e.g. in a way where the original issuer of a smartcard takes care of the authentication and then informs a service provider about the outcome of the authentication.

However, there are some problems in using smartcard authentication for services in the Internet. One reason is that most people use more than one computer for their sensitive transactions over the Internet. Therefore a smartcard reader has to be installed for each of the used computers. But even when a smartcard reader and the appropriate software are installed at each computer, a user does not know if the computer can be trusted or if sensitive data on the smartcard will be accessed unwantedly. Commercial certified smartcard readers are only certified for an environment trusted and controlled by the user.

It is an object of the invention to provide secure user authentication within a computer network, especially for the demand of Internet services. It is a further object of the invention to provide secure user authentication within a computer network, especially when performed on a non-trusted computer of the computer network.

SUMMARY OF THE INVENTION

The invention provides a method for processing authentication information in a smartcard reader, the method comprising the following steps: receiving a challenge in the smartcard reader and sending the challenge to a smartcard; receiving a response to the challenge from the smartcard, the response having at least a first part and a second part; in response to having received the challenge in the smartcard reader via an interface to a computing device during normal authentication, sending the response to the computing device; in response to having received the challenge in the smartcard reader via an interface to a computing device during an authentication preparation phase, sending the first part of the response to the computing device; and in response to having received the challenge in the smartcard reader via a user interface of the smartcard reader, presenting at least the second part of the response to a user via the user interface.

When receiving a challenge a smartcard reader will either send a response to a computing device or will send a first part of the response to the computing device or will display a second part of the response. Sending a response to the challenge is the usual case as already having been practised by methods according to the state of the art. Sending a first part of the response goes together with the computing device having access to the smartcard reader via an interface and is an option provided by a method according to the invention. Sending a second part of the response goes together with the smartcard reader receiving a challenge via an entering process initiated by a user.

The invention further provides a method for processing authentication information in an authentication server, the method comprising the following steps: sending a challenge during an authentication preparation phase for authenticating a user; in response to sending the challenge during an authentication preparation phase, receiving information representing a first part of a response to the challenge; storing the challenge and the first part of the response during the authentication preparation phase for further use during modified authentication; resending the challenge during modified authentication for authenticating the user; in response to resending the challenge, receiving information representing a second part of the response to the challenge; and checking the first and second parts of the response against the challenge and successfully authenticating the user during the modified authentication if the response proves to be valid.

The authentication server either will send a challenge during an authentication preparation phase or will resend the challenge during modified authentication for authenticating the user. There is provided a predefined criterion for triggering the intended authentication step, either preparation of an authentication in an authentication preparation phase or completing an authentication during modified authentication.

The criterion might be provided by a module either triggering the authentication server to resend a challenge for modified authentication or blocking the authentication server from sending a new challenge for an authentication preparation phase.

The term "computing device" as used with the present invention comprises personal computers, ticket, vending and cash machines, mobile phones and the like and is to be interpreted as broad as possible.

It is an advantage of a method according to the invention that the use of a smartcard with a non-trusted computing device does not provide access to sensitive information at the non-trusted computer, because the smartcard is used without connecting it to the non-trusted computer.

A user can for example be provided with a mobile smartcard reader comprising a keypad and a representing means, preferably a display, for abroad usage, preferably with a rechargeable battery, for use in an Internet Café. A challenge is displayed to the user on a computer screen and the user enters the challenge in the smartcard reader by means of the keypad. The smartcard encrypts the challenge and a second part of the response is displayed on the smartcard reader display. The user enters the second part of the response at the user interface of the computer. The first part of the response has already been stored in the authentication server when the user had performed a "home authentication", i.e. an authentication with a computing device to be trusted, also called authentication preparation phase.

The term "display" as used with the present invention is to be understood in its broadest sense and comprises all kinds of representing means accessible to a user's sensory perception, e.g. his visual, acoustic and/or haptic perception. Therefore "display a challenge or a response" also comprises audio display via an earphone, for example.

When a user is using the smartcard and a non-trusted computer, the same challenge as with the trusted computer is used again. The user inputs the challenge, preferably of reasonable length, to the smartcard, which calculates the response again. The user is favorably shown a second part of the response which has not been transmitted in the authentication preparation phase with the computing device to be trusted. The user then enters the second part of the response which is transmitted to the authentication server. The authentication server combines the first and second parts of the response and checks whether the combined response is valid.

In the case of a response to a challenge being a sequence of digits, a first part and a second part of the response each are a selection of these digits which may complement one another. "Combining" the first and the second parts of the response then means gaining the complete response.

A user may predefine a mask in an authentication preparation phase which determines the way the selection is made. For example, let the response be a sequence of 40 digits and the mask implement an alternating pattern of the following type: The first part of the response comprises the first, the third, the fifth etc. digit and the second part of the response comprises the second, the fourth etc. digit. The mask can as well implement another pattern: The first part of the response comprises the first to the thirtieth digit and the second part of the response comprises the thirty-first to the last digit. Actually, there are numerous alternative options. If the second response comprises no more than ten digits an abroad authentication is user-friendly in the sense that only few digits have to be entered in a keypad.

The security of a structure according to the invention relies on two authentication factors: the smartcard and the private authentication key together with the certificates stored on the smartcard. Therefore no proprietary certificates are used, and the authentication server can use any given infrastructure, like directory and revocation services for example, to check the validity of the smartcard and the private authentication key together with the certificates.

The security properties of such a structure are excellent. In case of an unauthorized access to the authentication server the invader will find stored challenges and first parts of responses which do not provide him with the complete information for authentication. If a computing device is attacked during data transmission the invader will only find first or second parts of responses which are useless to him. No relevant data is stored on the smartcard reader itself. If someone watches the user at a computing device, gained information is useless as long as each challenge is used only once.

Therefore each challenge stored in the authentication server is used only once though it is principally possible to use one challenge several times.

In a preferred embodiment of the method at least one challenge is generated and stored in the authentication server after the step of requesting access to the computer net via a computing device to be trusted.

The term "at least one challenge" comprises the case of generating several challenges in order to maintain a certain supply of challenges. This is advantageous in case a user does not have access to a computing device to be trusted for a while but has to use computing devices not to be trusted for several times. Usually an 8 digit number is sufficient to build a challenge. Every time the user requests an authentication from abroad, i.e. from a non-trusted computing device, the authentication server sends one of the 8 digit numbers.

In a further preferred embodiment of the method after receiving a challenge from the authentication server the challenge is encrypted on the smartcard.

The challenge is favorably encrypted with a private authentication key on the smartcard after entering a PIN in a keypad of the smartcard reader.

The step of checking whether the response is valid favorably comprises the step of decrypting the first and the second parts of the encrypted response and checking them against the challenge.

The first and the second part of the encrypted response are preferably decrypted with the user's public key, i.e. an asymmetric key design is applied.

In a very practical embodiment of the method the second part of the response comprises a limited number of digits, preferably between 6 and 12 digits, selected from the complete response. In this case it is especially preferred to select the last 6 to 12 digits from the complete response. This restricted number of digits allows a convenient entering by a user. Also the challenge may comprise a limited number of digits, for example between 6 and 12 digits. The number of digits is a compromise between the requirements of security versus the requirements of practicability and comfort.

The method according to the invention is very well suitable to authenticate any user if the first and the second parts of the response are checked against the challenge and the response proves to be valid.

The invention also provides a computer program product containing computer executable instructions for processing authentication information in a smartcard reader and a computer program product containing computer executable instructions for processing authentication information in an authentication server, each of the computer program products corresponding to one of the methods as described above.

The invention further provides a smartcard reader for processing authentication information, the smartcard reader comprising: a user interface component for presenting information to a user and receiving input information from the user; a first component for providing an interface to a computing device for at least receiving a challenge from the computing device; a second component for providing an interface to a smartcard for at least sending a challenge to the smartcard and receiving a response to the challenge from the smartcard, the response having at least a first part and a second part; and a processing component for controlling operation of the smartcard reader, the processing component causing: the first component to send a response received from the smartcard to the computing device in response to the smartcard reader having received the respective challenge via the interface to the computing device during normal authentication; the first component to send the first part of a response received from the smartcard to the computing device in response to the smartcard reader having received the respective challenge via the interface to the computing device during an authentication preparation phase; and the user interface component to present at least the second part of a response received from the smart card via the user interface component in response to the smartcard reader having received the respective challenge via the user interface component.

The invention in addition provides a computing system, for example an authentication server, for processing authentication information, the computing system comprising: means for sending a challenge during an authentication preparation phase for authenticating a user; means for receiving, in response to sending the challenge during an authentication preparation phase, information representing a first part of a response to the challenge; means for storing the challenge and the first part of the response during the authentication preparation phase for further use during modified authentication; means for resending the challenge during modified authentication for authenticating the user; means for receiving, in response to resending the challenge, information representing a second part of the response to the challenge, and means for checking the first and second parts of the response against the challenge and successfully authenticating the user during the modified authentication if the response proves to be valid.

The smartcard reader is adapted to send a first part of a response to a challenge transmitted from the authentication server in a first step and to display a second part of the response to the challenge entered by a user in a second step.

In a preferred embodiment the smartcard reader and the authentication server each are adapted to be used for performing one of the methods as described above.

Examples of smartcards are signature cards from Telesec, Signtrust, TC Trustcenter and D-Trust. Many cards provide a key for authentication and a key for signing documents. Both keys can be used under the algorithm aspect and should be chosen in accordance with the key usage policy of the smartcard.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

BRIEF DESCRIPTION OF THE DRAWINGS

The invention will be better understood from the following detailed description with reference to the drawings, wherein.

DETAILED DESCRIPTION OF THE INVENTION

Figure 1:
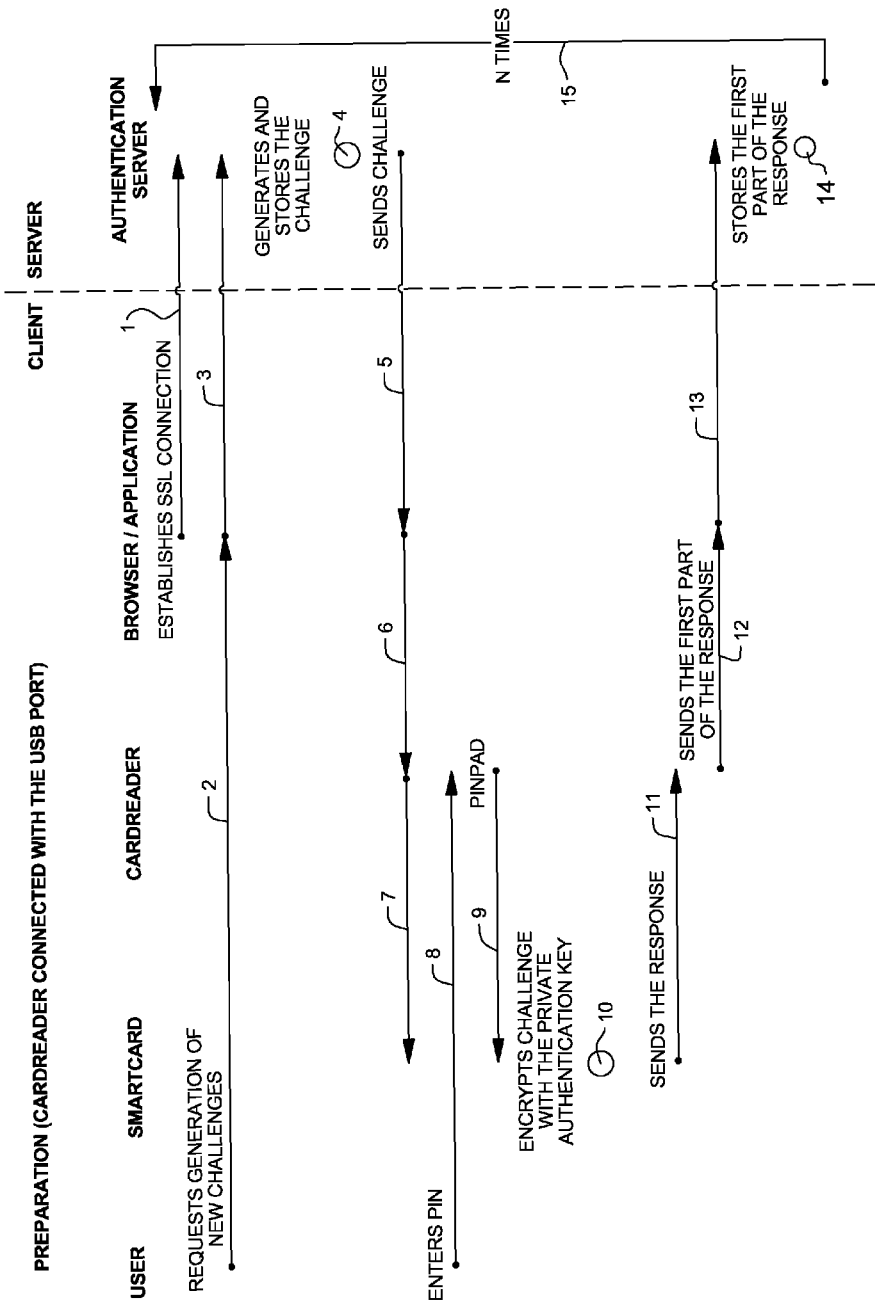
FIG. 1 is a diagram illustrating the steps of requesting access to a computer network via a first computing device by connecting a smartcard to the first computing device by means of a mobile smartcard reader and receiving a challenge from an authentication server and transmitting a first part of a response to the authentication server.

The setting is a Client/Server interface indicated by a vertical broken line. The Client runs on the first computing device which is not shown in FIG. 1. The Client side comprises a User, a Smartcard, a Browser/Application and a Cardreader which may be connected to the first computing device via a USB (Universal Serial Bus) Port for data exchange and eventually for loading a battery of the Cardreader, and the Server side comprises an Authentication Server.

In a first step a SSL (Secure Sockets Layer) connection between the Browser/Application and the Authentication Server is established as indicated by arrow 1. With an SSL connection "man-in-the-middle-attacks" can be avoided, for example.

In a next step the User requests the generation of new challenges. The request is addressed to the Browser/Application as indicated by arrow 2 and transferred to the Authentication Server as indicated by arrow 3. The Authentication Server thereupon generates and stores one or more challenges 4.

In a further step a challenge 4 is sent to the Cardreader via the Browser/Application as indicated by arrows 5 and 6. The challenge 4 is transferred from the Cardreader to the Smartcard as shown by arrow 7.

The User enters a PIN in a Pinpad of the Cardreader according to arrow 8. The PIN is sent to the Smartcard, see arrow 9. The challenge 4 is encrypted with the User's private authentication key. The encrypted challenge 10, which is called the response, is generated on the Smartcard.

The Smartcard sends the response to the Cardreader according to arrow 11, and from the Cardreader a first part of the response is sent to the Authentication Server via the Browser/Application, see arrows 12 and 13. The first part of the response 14 is stored in the Authentication Server.

The process as illustrated in FIG. 1 can be repeated n times, n being an integer, according to arrow 15, in order to store first parts of responses 14 for n challenges 4.

Figure 2:
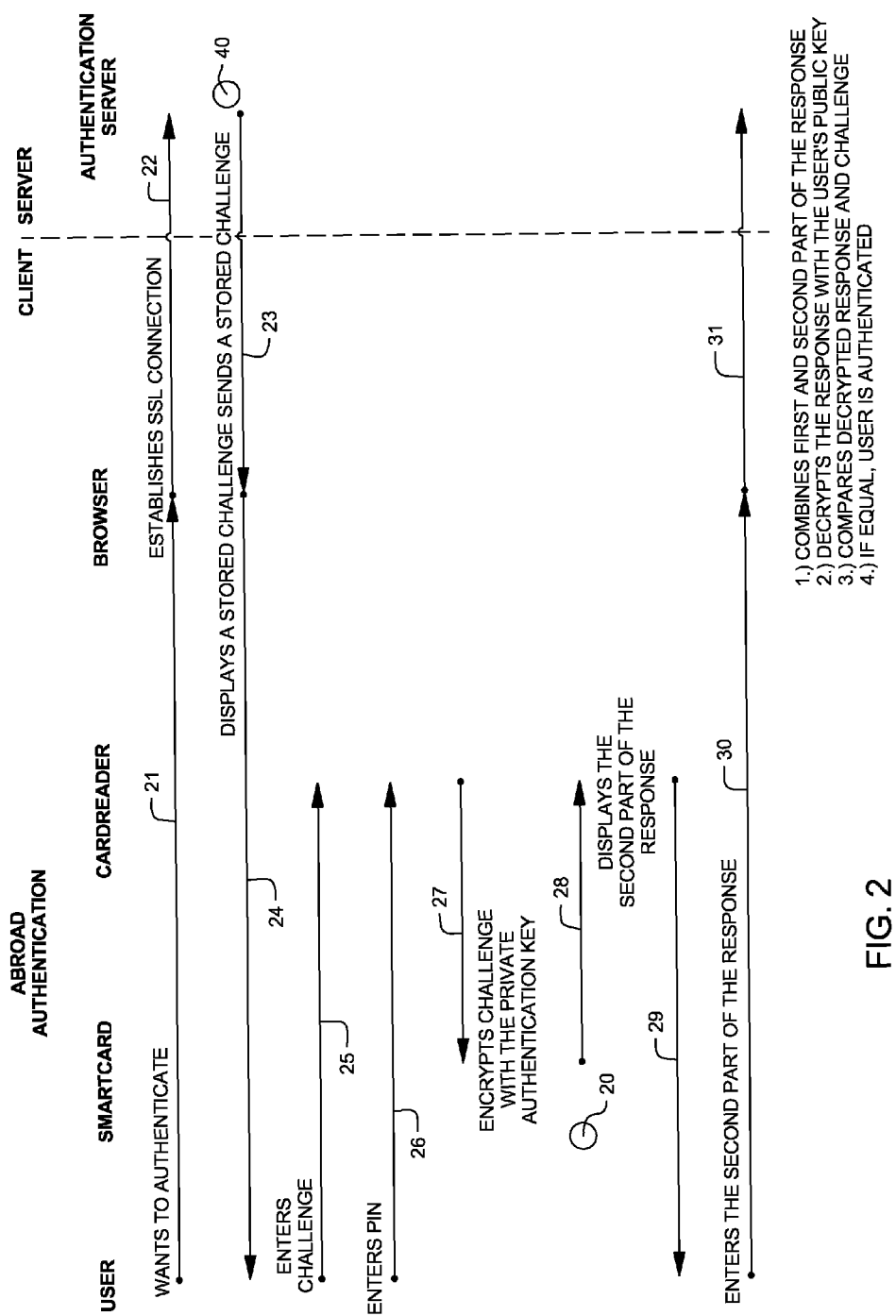
FIG. 2 is a diagram illustrating the steps of requesting access to the computer network via a second computing device and connecting the smartcard to the mobile smartcard reader and receiving a challenge from the authentication server and transferring a second part of a response whereupon the authentication server combines the first and the second parts of the responses and checks whether the response is valid.

The process as described in FIG. 1 can be considered as a preparation process for a process as described in FIG. 2.

The preparation process can be initiated by a user or automatically, for example when a supply of stored unused challenges falls below a certain limit. There can also be provided an automatic routine to remind a user to initiate a preparation process, for example by sending an email message.

It will ease the preparation process if the Smartcard allows an authentication multiple times after the user has entered his PIN.

After a preparation process with a trusted computing device has been performed successfully, the connected smartcard reader can be switched to "abroad authentication" in order to function within a process of authentication with a non-trusted computing device as default case.

FIG. 2 is a diagram illustrating the steps of requesting access to the computer network via a second computing device and connecting the smartcard to the mobile smartcard reader and receiving a challenge from the authentication server and transferring a second part of a response whereupon the authentication server combines the first and the second parts of the responses and checks whether the response is valid.

The setting in FIG. 2 is a Client/Server interface indicated by a vertical broken line as in FIG. 1. The Client runs on the second computing device which is not shown in FIG. 2. The Client side comprises a User, a Smartcard, a Browser and the Cardreader which is not connected to the second computing device, and the Server side comprises the Authentication Server.

In a first step the User wants to authenticate, see arrow 21, and therefore a SSL (Secure Sockets Layer) connection between the Browser and the Authentication Server is established as indicated by arrow 22.

In a next step the Authentication Server sends a stored challenge 40, which is assumed to be identical to the challenge 4 in FIG. 1, to the Browser as illustrated by arrow 23, and the Browser displays the stored challenge 40 to the User, see arrow 24.

In a further step the User enters the challenge 40 in the Cardreader as indicated by arrow 25, and then the User enters the PIN in the Cardreader as indicated by arrow 26.

The Cardreader sends the challenge 40 to the Smartcard as indicated by arrow 27. The challenge 40 is encrypted with the private authentication key, and the encrypted challenge 20, which is assumed to be identical to the encrypted challenge 10 in FIG. 1, both called the response, is stored on the Smartcard. The Smartcard sends the response to the Cardreader according to arrow 28, and from the Cardreader a second part of the response is displayed to the User according to arrow 29.

Then the User enters the second part of the response which is sent to the Authentication Server via the Browser, see arrows 30 and 31.

The Authentication Server combines the first and the second parts of the response according to 1), then decrypts the response with the User's public key according to 2), then compares the decrypted response and challenge according to 3). If the decrypted response equals the challenge the User is authenticated according to 4).

The process as described in FIG. 2 is to be considered as abroad authentication which is based on the preparation process as described in FIG. 1.

Figure 3:
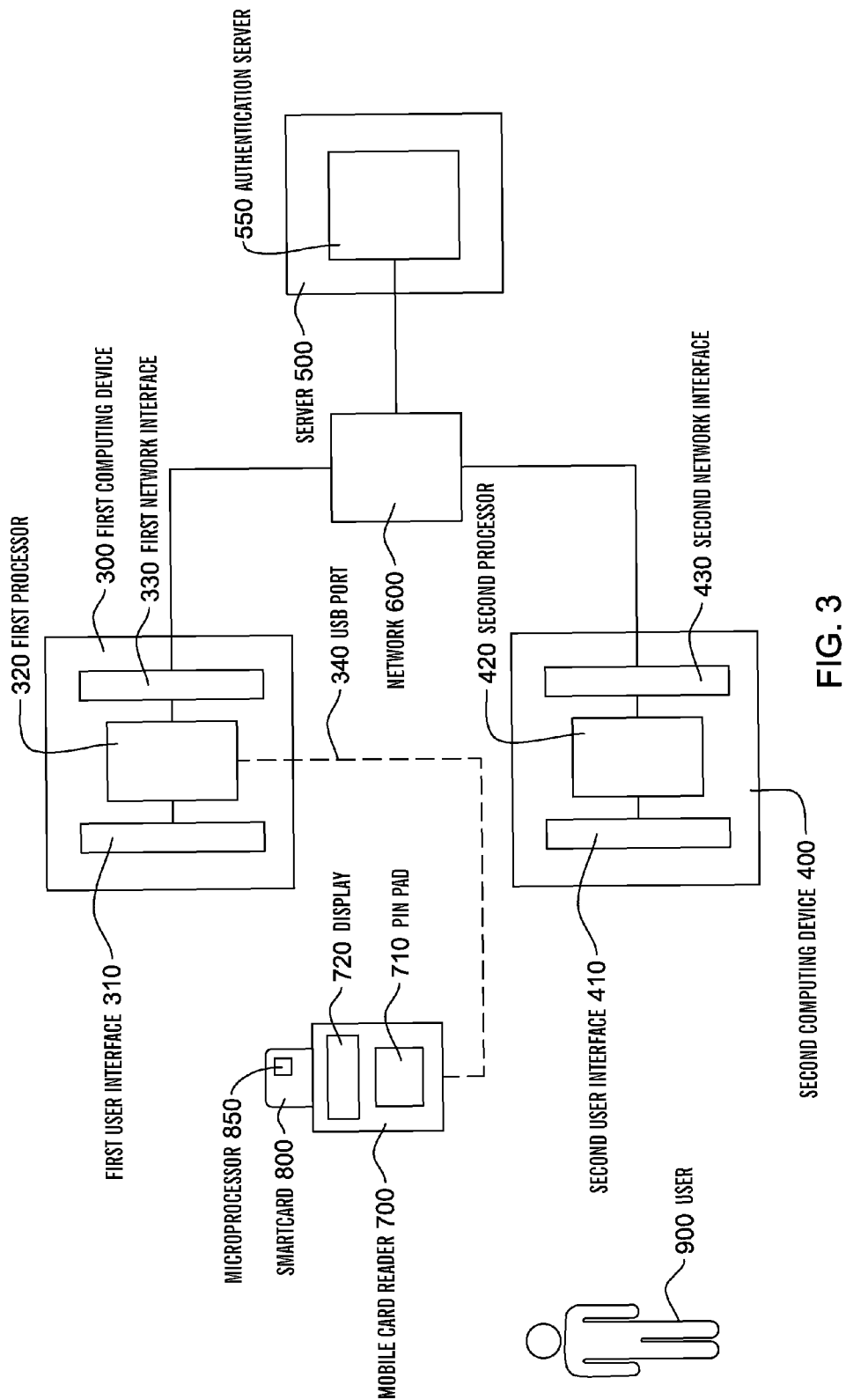
FIG. 3 is a schematic illustration of an exemplary environment for the use of the present invention.

FIG. 3 is a schematic illustration of an exemplary environment for the use of the present invention.

A first computing device 300 and a second computing device 400 are connected to a server 500 via a network 600. The first computing device 300 comprises a first user interface 310, a first processor 320 and a first network interface 330. The second computing device 400 comprises a second user interface 410, a second processor 420 and a second network interface 430. The server 500 comprises an authentication server 550. A mobile card reader 700 comprises a pin pad 710 and a display 720 and is adapted to receive a smartcard 800 comprising a microprocessor 850. The microprocessor 850 is adapted to encrypt and decrypt challenges. The mobile card reader 700 can be connected to the first computing device 300 via a USB port 340 as indicated by a broken line. If the first computing device 300 is a computing device to be trusted by a user 900 then a process as described in FIG. 1 is performed. The mobile card reader 700 can be used when working at the second computing device 400 but without being connected to the second computing device 400. If the second computing device 400 is a computing device not to be trusted by the user 900 then a process as described in FIG. 2 is performed.

It is to be noted that the aspects and embodiments described herein may be conveniently implemented using a machine, e.g. a general purpose computing device, programmed according to the teachings of the present specification, as will be apparent to those skilled in the computer art. Appropriate software coding can readily be prepared by skilled programmers based on the teachings of the present disclosure, as will be apparent to those skilled in the software art.

Such software may be a computer program product that employs a machine-readable medium. A machine-readable medium may be any medium that is capable of storing and/or encoding a sequence of instructions for execution by a machine, e.g. a general purpose computing device, and that causes the machine to perform any one of the methodologies and/or embodiments described herein. Examples of a machine-readable medium include, but are not limited to, a magnetic disk, e.g. a conventional floppy disk, a hard drive disk, an optical disk, e.g. a compact disk "CD", such as a readable, writeable, and/or re-writable CD; a digital video disk "DVD", such as a readable, writeable, and/or rewritable DVD, a magneto-optical disk, a read-only memory "ROM" device, a random access memory "RAM" device, a magnetic card, an optical card, a solid-state memory device, e.g. a flash memory, an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory.

Examples of a general purpose computing device include, but are not limited to, a computer workstation, a terminal computer, a server computer, a handheld device, e.g. tablet computer, a personal digital assistant "PDA", a mobile telephone etc., a web appliance, a network router, a network switch, a network bridge, any machine capable of executing a sequence of instructions that specify an action to be taken by that machine, and any combinations thereof. In one example, a general purpose computing device may include and/or be included in a kiosk.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for processing authentication information in a smartcard reader, said method comprising:
    receiving, by the smartcard reader, a challenge from an authentication server via a first computing device connected to the authentication server via a network;
    after said receiving the challenge, said smartcard reader transferring the challenge to a smartcard;
    after said transferring the challenge to the smartcard, said smartcard reader receiving a response to the challenge from the smartcard, said response comprising an encryption of the challenge, said response comprising a first part and a second part, said encryption of the challenge having been generated through use of a private authentication key of a user;
    in response to the smartcard reader having received the response from the smartcard, said smartcard reader sending the first part of the response to the authentication server via the first computing device;
    after said sending the first part of the response to the authentication server, said smartcard reader obtaining the challenge from the authentication server via a second computing device connected to the authentication server via the network, said second computing device and said first computing device being different computing devices;
    after said obtaining the challenge, said smartcard reader providing the challenge to the smartcard;
    after said providing the challenge to the smartcard, said smartcard reader obtaining the response from the smartcard;
    in response to the smartcard reader having obtained the response from the smartcard, displaying the second part of the response to the user via a user interface at the smartcard reader.

2. The method of claim 1, said method further comprising:
    after said transferring the challenge to the smartcard, said smartcard reader receiving a first entry by the user of a Personal Identification Number (PIN) of the user at the smartcard reader; and
    in response to said receiving the first entry of the PIN, said smartcard reader sending the first entry of the PIN to the smartcard,
    wherein said receiving the response from the smartcard is performed after the response has been generated by the smartcard in response to the smartcard having received the first entry of the PIN from the smartcard reader.

3. The method of claim 2, said method further comprising:
    after said providing the challenge to the smartcard, said smartcard reader receiving a second entry by the user of the PIN at the smartcard reader; and
    in response to said receiving the second entry of the PIN, said smartcard reader sending the second entry of the PIN to the smartcard,
    wherein said obtaining the response from the smartcard is performed after the response has been generated by the smartcard in response to the smartcard having received the second entry of the PIN from the smartcard reader.

4. The method of claim 1, said method further comprising:
    in response to said displaying the second part of the response to the user, receiving an entry by the user of the second part of the response;
    in response to said receiving the second part of the response, sending the second part of the response to the authentication server via the second computing device.

5. The method of claim 4, said response consisting of the first part and the second part, said method further comprising:
    after the authentication server has received the second part of the response sent via the second computing device, said authentication server generating a combined response by combining the first and second parts of the response;
    after said generating the combined response, said authentication server decrypting the combined response; and
    said authentication server determining that the decrypted combined response is equal to the challenge.

6. The method of claim 1, wherein the first computing device is a trusted computing device that is trusted by the user, and wherein the second computing device is a non-trusted computing device that is not trusted by the user.

7. A computer program product, comprising a computer readable physically tangible storage device having computer readable program code stored therein, said program code configured to be executed by at least one processor of a data processing system to implement a method for processing authentication information in a smartcard reader comprised by the data processing system, said method comprising:
    receiving, by the smartcard reader, a challenge from an authentication server via a first computing device connected to the authentication server via a network;
    after said receiving the challenge, said smartcard reader transferring the challenge to a smartcard;
    after said transferring the challenge to the smartcard, said smartcard reader receiving a response to the challenge from the smartcard, said response comprising an encryption of the challenge, said response comprising a first part and a second part, said encryption of the challenge having been generated through use of a private authentication key of a user;
    in response to the smartcard reader having received the response from the smartcard, said smartcard reader sending the first part of the response to the authentication server via the first computing device;
    after said sending the first part of the response to the authentication server, said smartcard reader obtaining the challenge from the authentication server via a second computing device connected to the authentication server via the network, said second computing device and said first computing device being different computing devices;
    after said obtaining the challenge, said smartcard reader providing the challenge to the smartcard;
    after said providing the challenge to the smartcard, said smartcard reader obtaining the response from the smartcard;

in response to the smartcard reader having obtained the response from the smartcard, displaying the second part of the response to the user via a user interface at the smartcard reader.

8. The computer program product of claim 7, said method further comprising:
   after said transferring the challenge to the smartcard, said smartcard reader receiving a first entry by the user of a Personal Identification Number (PIN) of the user at the smartcard reader; and
   in response to said receiving the first entry of the PIN, said smartcard reader sending the first entry of the PIN to the smartcard,
   wherein said receiving the response from the smartcard is performed after the response has been generated by the smartcard in response to the smartcard having received the first entry of the PIN from the smartcard reader.

9. The computer program product of claim 8, said method further comprising:
   after said providing the challenge to the smartcard, said smartcard reader receiving a second entry by the user of the PIN at the smartcard reader; and
   in response to said receiving the second entry of the PIN, said smartcard reader sending the second entry of the PIN to the smartcard,
   wherein said obtaining the response from the smartcard is performed after the response has been generated by the smartcard in response to the smartcard having received the second entry of the PIN from the smartcard reader.

10. The computer program product of claim 7, said method further comprising:
    in response to said displaying the second part of the response to the user, receiving an entry by the user of the second part of the response;
    in response to said receiving the second part of the response, sending the second part of the response to the authentication server via the second computing device.

11. The computer program product of claim 10, said response consisting of the first part and the second part, said method further comprising:
    after the authentication server has received the second part of the response sent via the second computing device, said authentication server generating a combined response by combining the first and second parts of the response;
    after said generating the combined response, said authentication server decrypting the combined response; and
    said authentication server determining that the decrypted combined response is equal to the challenge.

12. The computer program product of claim 7, wherein the first computing device is a trusted computing device that is trusted by the user, and wherein the second computing device is a non-trusted computing device that is not trusted by the user.

13. A data processing system comprising at least one processor, a computer readable memory unit coupled to the processor, and a physically tangible storage device coupled to the processor, said storage device storing program code configured to be executed by the at least one processor via the memory unit to implement a method for processing authentication information in a smartcard reader comprised by the data processing system, said method comprising:
    receiving, by the smartcard reader, a challenge from an authentication server via a first computing device connected to the authentication server via a network;
    after said receiving the challenge, said smartcard reader transferring the challenge to a smartcard;
    after said transferring the challenge to the smartcard, said smartcard reader receiving a response to the challenge from the smartcard, said response comprising an encryption of the challenge, said response comprising a first part and a second part, said encryption of the challenge having been generated through use of a private authentication key of a user;
    in response to the smartcard reader having received the response from the smartcard, said smartcard reader sending the first part of the response to the authentication server via the first computing device;
    after said sending the first part of the response to the authentication server, said smartcard reader obtaining the challenge from the authentication server via a second computing device connected to the authentication server via the network, said second computing device and said first computing device being different computing devices;
    after said obtaining the challenge, said smartcard reader providing the challenge to the smartcard;
    after said providing the challenge to the smartcard, said smartcard reader obtaining the response from the smartcard;
    in response to the smartcard reader having obtained the response from the smartcard, displaying the second part of the response to the user via a user interface at the smartcard reader.

14. The data processing system of claim 13, said method further comprising:
    after said transferring the challenge to the smartcard, said smartcard reader receiving a first entry by the user of a Personal Identification Number (PIN) of the user at the smartcard reader; and
    in response to said receiving the first entry of the PIN, said smartcard reader sending the first entry of the PIN to the smartcard,
    wherein said receiving the response from the smartcard is performed after the response has been generated by the smartcard in response to the smartcard having received the first entry of the PIN from the smartcard reader.

15. The data processing system of claim 14, said method further comprising:
    after said providing the challenge to the smartcard, said smartcard reader receiving a second entry by the user of the PIN at the smartcard reader; and
    in response to said receiving the second entry of the PIN, said smartcard reader sending the second entry of the PIN to the smartcard,
    wherein said obtaining the response from the smartcard is performed after the response has been generated by the smartcard in response to the smartcard having received the second entry of the PIN from the smartcard reader.

16. The data processing system of claim 13, said method further comprising:
    in response to said displaying the second part of the response to the user, receiving an entry by the user of the second part of the response;
    in response to said receiving the second part of the response, sending the second part of the response to the authentication server via the second computing device.

17. The data processing system of claim 16, said response consisting of the first part and the second part, said method further comprising:
    after the authentication server has received the second part of the response sent via the second computing device, said authentication server generating a combined response by combining the first and second parts of the response;

after said generating the combined response, said authentication server decrypting the combined response; and said authentication server determining that the decrypted combined response is equal to the challenge.

18. The data processing system of claim 13, wherein the first computing device is a trusted computing device that is trusted by the user, and wherein the second computing device is a non-trusted computing device that is not trusted by the user.

* * * * *